US011590729B2

(12) United States Patent
Berrang (10) Patent No.: US 11,590,729 B2
(45) Date of Patent: Feb. 28, 2023

(54) COMPOSITE ULTRA-HIGH MOLECULAR WEIGHT POLYETHYLENE (UHMWPE) MATERIAL AND METHOD OF MANUFACTURE OF THE SAME (71) Applicant: ALUULA COMPOSITES INC., Victoria (CA)

(72) Inventor: Peter Berrang, Sidney (CA)

(*) Notice: Subject to any disclaimer, the term of this patent is extended or adjusted under 35 U.S.C. 154(b) by 567 days.

(21) Appl. No.: 16/625,077

(22) PCT Filed: Jun. 15, 2018

(86) PCT No.: PCT/CA2018/050733
§ 371 (c)(1),
(2) Date: Dec. 20, 2019

(87) PCT Pub. No.: WO2019/006542
PCT Pub. Date: Jan. 10, 2019

(65) Prior Publication Data
US 2020/0139665 A1 May 7, 2020

Related U.S. Application Data (60) Provisional application No. 62/529,124, filed on Jul. 6, 2017.

(51) Int. Cl.
B32B 27/12 (2006.01)
B32B 5/02 (2006.01)
(Continued)

(52) U.S. Cl.
CPC .............. B32B 5/024 (2013.01); B32B 27/12 (2013.01); B32B 37/185 (2013.01); B63H 8/10 (2020.02);
(Continued)

(58) Field of Classification Search
CPC .................................................... B32B 27/12
See application file for complete search history.

(56) References Cited

U.S. PATENT DOCUMENTS 4,708,078 A 11/1987 Legaignoux et al.
4,876,774 A * 10/1989 Kavesh ................ D06C 7/02
139/420 R
(Continued)

FOREIGN PATENT DOCUMENTS

JP S62 111738 A 5/1987
WO 2013/016405 A1 1/2013
WO 2017/060469 A1 4/2017

OTHER PUBLICATIONS

International Search Report Corresponding to PCT/CA2018/050733 dated Sep. 5, 2018.
(Continued)

Primary Examiner — Andrew T Piziali (57) ABSTRACT

Woven UHMWPE fabric stretches in the bias direction to such an extent that it is unsuitable for many potential applications and is porous, allowing air and water transmission. A composite UHMWPE material includes a single ply of high tenacity woven UHMWPE fabric having warp fibers in a first direction and weft fibers in a second direction orthogonal to the first direction. The UHMWPE fabric has first face and a second face. A stretch resisting axially oriented fusion layer is fused to at least one of the first face or the second face of the UHMWPE fabric with an axis aligned parallel to at least one of the UHMWPE fabric warp and weft axes, such that the stretch resisting fusion layer increases fabric tensile strength and inhibits bias stretch of the UHMWPE fabric, and renders the UHMWPE woven fabric air and water impermeable.

13 Claims, 4 Drawing Sheets (51) Int. Cl.
  *B63H 8/10* (2020.01)
  *B32B 37/18* (2006.01)
  *D03D 15/283* (2021.01)
(52) U.S. Cl.
  CPC .... *D03D 15/283* (2021.01); *B32B 2262/0253* (2013.01); *B32B 2307/518* (2013.01); *B63B 2231/40* (2013.01); *D10B 2321/0211* (2013.01); *D10B 2507/04* (2013.01)

(56) References Cited

U.S. PATENT DOCUMENTS

| | | | |
|---|---|---|---|
| 5,106,472 A | | 11/1992 | Zachariades |
| 6,280,546 B1 * | | 8/2001 | Holland ................. B32B 33/00 156/84 |
| 7,104,504 B2 | | 9/2006 | Peterson et al. |
| 7,622,406 B2 * | | 11/2009 | Holland ................. B32B 27/08 442/286 |
| 7,763,556 B2 * | | 7/2010 | Nguyen .................... E06B 9/02 52/273 |
| 2006/0192055 A1 | | 8/2006 | Shogren |
| 2009/0179112 A1 | | 7/2009 | Gu |

OTHER PUBLICATIONS

Written Opinion Corresponding to PCT/CA2018/050733 dated Sep. 5, 2018.

* cited by examiner

COMPOSITE ULTRA-HIGH MOLECULAR WEIGHT POLYETHYLENE (UHMWPE) MATERIAL AND METHOD OF MANUFACTURE OF THE SAME

Composite ultra-high molecular weight polyethylene (UHMWPE) material and method of manufacturer of the same

FIELD

There is described a composite UHMWPE material and a method of manufacture of the same. This composite UHMWPE material was developed for use in making kites for the sport of kite boarding on water or land, but it is now realized that the material is suitable for use in other applications, such as tents, tarps, sails, carry-bags and balloons.

BACKGROUND

Kite boarding, sometimes also referred to as kite surfing, is an extreme sport whereby a person uses a kite, generally having a "C" or modified "C" shape. Such shape, also termed "a leading edge (LE) inflatable kite", is created by using a hand or electrically operated pump to inflate a bladder contained within a protective cover material forming the kite's leading edge. The kite's leading edge, which forms a rigid C-shaped 10 cm-25 cm diameter round tube when inflated, also has one or more orthogonally aligned abutting struts, which structure supports the fabric material forming the kite canopy. Kites are deflated for packaging and transport. During use, the kite's leading edge and struts are inflated to about 5-10 psi (34-69 kPa), depending on kite size, above ambient atmospheric pressure. The leading edge and strut bladders can be inflated simultaneously, or separately. Without inflation, or low inflation, a kite becomes floppy in the water, with some wind drag, but cannot create an aerodynamic shape.

Modern prior art kites are attached to 4 (or 5) lines, which lines are generally 10-30 meters in length, and are also attached (tethered) to the kite rider, who is wearing a special harness, allowing the kite rider, while standing on a surfboard-like device, to be pulled along the surface of the water due to wind powering the kite. Besides water-based kite boarding, kites are also used on land where the rider stands on a skateboard type device (with wheels) travelling on, for example, packed sand, or sitting in a device with wheels for travel over a hard surface. Recently, kites have also been deployed by snow boarders for use over snow-covered areas.

U.S. Pat. No. 4,708,078 by Legaignoux, et al. teaches the first use of a kite design that can be re-launched from the water surface, which key innovation spurred the sport of kite boarding. Subsequent innovations seek to improve on re-launching the kite from the water surface, such as, for example, U.S. Pat. No. 7,104,504 B2 by Peterson et al. which describes a system whereby the kite rider can use a dedicated line (or piggybacking onto one of the existing lines) to adjust the kite canopy profile to exhibit different aerodynamic characteristics to facilitate re-launching the kite.

A key aspect of all kites is weight, as the overall kite weight will determine the ease of re-launch, the ability of the kite to fly in light winds, and the kite's response while being powered through the horizon. A lighter kite will also reduce handling and shipping weight, and volume.

Most modern kites are comprised of four basic elements that contribute to the kite's overall weight: the LE (leading edge) and struts, the bladders within the LE and struts, the canopy and the various reinforcing elements for inflating the bladder and attaching the kite lines to the leading edge. The estimated weight contributions of the various kite components for prior art kites are, 35% for the LE material, 35% for the bladder material, 20% for the canopy material, and 10% for the other miscellaneous items such as seam stick tape, webbing, thread, valves, valve tubing, clamps, scuff pad material, zippers and Velcro.

In an effort to minimize weight, prior art kites generally use a tightly woven fabric made from polyethylene terephthalate fibers, which material is trademarked as "Dacron" by du Pont in North America. The Dacron fabric commonly used for the kite's LE has a weight of about 160 gsm (grams per square meter). The weight of this fabric has a tensile strength of about 108 lb/inch (950 N/5 cm) in the warp direction and about 137 lb/inch (1200 N/5 cm) in the weft direction. As an example, for a 12 m2 Ocean Rodeo Sports Inc., Victoria, Canada, "Flite" kite, with a LE diameter of about 17 cm, pumped to 7-8 psi (48-55 kPa), the air pressure exerted on the LE fabric in the radial direction is about 70-84 lb/inch. (613-735 N/5 cm). As the tensile strength of the 160 gsm Dacron fabric in the warp direction is about 108 lb/inch (950 N/5 cm), the Dacron fabric tensile strength provides a safety margin of about 40% if used in the radial orientation.

However, the LE Dacron fabric must not only withstand the radial and longitudinal forces imposed by the pressurized air from the bladder, but also any over-pressurization due to over pumping, overheating in direct sunlight, or being forcefully crashed onto the water surface; These actions can cause the Dacron fabric to rupture, and the air bladder to expand, herniate, and explode, resulting in the kite's destruction. The LE fabric must also withstand repeated water immersions, and especially abrasion, as kites are often dragged across sand and rough land surfaces during launch and landing.

The kite's canopy determines the size rating of a kite. Most current kites range in size from about 5 m2 to about 17 m2. The canopy fabric is generally comprised of a Ripstop nylon fabric, weighing about 50 gsm, and represents about 20% of the overall kite weight. This canopy material is fragile, and tears easily, making the use of such fabric for the canopy problematic.

There are some prior art examples of efforts to fabricate a lighter kite. Shogren in US Patent Application 2006/0192055 A1 discloses a bladderless or partially bladderless kite made from CUBAN FIBER, which is a high strength synthetic material comprised of polymer filaments, with the kite having a smaller diameter leading edge and an aerodynamic shape. No data are provided regarding actual kite weight reduction, although the author claims such a kite could fly in 3-5 knot wind velocity. However, these kites were found to be difficult to control, and had the seams fail at the leading edge due to flawed sewing and sealing technology.

To create a lighter kite, some kite manufacturers have also reduced the number of kite struts from 5 to only 1-3, and in some cases to none. However, flying a kite with no or 1 strut affects kite performance, especially in high winds.

Commercially available woven UHMWPE fabric has a number of desirable qualities. For example, it is lightweight and resistant to wear, impact and abrasion. However, woven UHMWPE fabric would not normally be considered a suitable material for use in making a kite. Woven UHMWPE fabric tends to stretch in the bias direction to an unacceptable extent. Woven UHMWPE fabric is also porous, allowing air and water transmission. There will hereinafter be described a composite UHMWPE material, that is suitable for making a kite. There will further be described technical problems experienced in developing the composite UHMWPE material and the methodology that was developed to overcome those technical problems.

SUMMARY

Upon studying the stretching characteristics of UHMWPE fabric, it was determined that a bias stretch was problematic for using such fabric directly as kite material. This problem was addressed by bonding a fusion layer to limit fabric bias stretch, where such fusion layer fused the warp fibers and the weft fibers at their contact points against relative movement. The composite UHMWPE material, described below, retains the desirable qualities of UHMWPE fabric, while resolving the bias stretching problem that rendered UHMWPE fabric unsuitable for use by reducing fabric bias stretch.

As noted above, woven UHMWPE fabric is also porous, allowing air and water transmission, which feature is problematic for use as kite material. The use of a one or more bonded fusion layers addresses this problem by making the UHMWPE woven fabric air and water impervious.

According to one aspect there is provided a composite UHMWPE material, which includes a single ply of high tenacity woven UHMWPE fabric having warp fibers in a first direction and weft fibers in a second direction orthogonal to the first direction. The UHMWPE fabric has a first face and a second face. A fusion layer is fused to at least one of the first face or the second face of the UHMWPE fabric, causing the warp and weft fiber contact points to at least partially fuse, thus preventing the warp and weft fibers from sliding, thereby inhibiting bias stretch of the UHMWPE fabric.

According to another aspect there is provided a composite UHMWPE material, which includes a single ply of high tenacity woven UHMWPE fabric having warp fibers in a first direction and weft fibers in a second direction orthogonal to the first direction. The UHMWPE fabric has a first face and a second face. A stretch resistant biaxially oriented polymer fusion layer is fused to at least one of the first face or the second face of the UHMWPE fabric, which fusion layer has an axis aligned parallel with at least one of the first direction or the second direction of the UHMWPE fabric, where such aligned and bonded fusion layer inhibits bias stretch of the UHMWPE fabric, while at the same time increasing the composite fabric warp and weft tensile strengths.

The use of adhesives such as acrylics or epoxies for bonding a polymer film or films to resist bias stretching of the UHMWPE fabric is problematic, as such a bonding approach adds weight to the overall composite, and requires surface treatment of the UHMWPE fabric and polymer films by corona or chromic acid etching to reduce the material surface tension. Also, such adhesively bonded surfaces tend to delaminate over time when subjected to constant bond stress. For these reasons, heat fusing was attempted. However, a number of problems were experienced in attempting to heat fuse a bias stretch resisting fusion layer or a biaxially oriented bias stretch resisting fusion layer, to UHMWPE fabric. The UHMWPE fabric shrank, sometimes as much as 60%, when heat was applied during the fusing process. This shrinkage rendered the resulting composite UHMWPE material unsuitable for use. This gave rise to the development of a method of manufacture of the composite UHMWPE material.

According to another aspect there is provided a method of manufacture of the composite UHMWPE material described above. A first step involves providing a single ply of high tenacity ultra-high molecular weight polyethylene woven UHMWPE fabric having warp fibers in a first direction and weft fibers in a second direction orthogonal to the first direction. The UHMWPE fabric has a first face and a second face. A second step involves positioning a stretch resisting fusion layer or an biaxially oriented fusion layer, against at least one of the first face or the second face of the UHMWPE fabric which, for the biaxially oriented fusion layer has an axis aligned parallel with at least one of the fabric's warp of weft axes, without tension. A third step involves constraining the warp fibers of the UHMWPE fabric from shrinking and constraining the weft fibers of the UHMWPE fabric from shrinking. A fourth step involves applying heat exceeding the melt temperature of the unconstrained UHMWPE fabric, thereby fusing the stretch resisting fusion layer or biaxially oriented fusion layer to the UHMWPE fabric while continuing to constrain the warp fibers and the weft fibers to inhibit shrinkage of the UHMWPE fabric. A fifth step involves cooling the heated UHMWPE composite fabric to room temperature while remaining constrained. Such cooling can be done by quenching in a room temperature water bath, or by air cooling to ambient room temperature.

The method described greatly reduced UHMWPE fabric bias stretch and fabric shrinkage and also served to render the resulting composite UHMWPE material water and air impermeable.

In order to reduce the physical space required to facilitate manufacturing, it is preferred that a step be taken of wrapping the UHMWPE fabric and the stretch resisting fusion layer around a cylinder one on top of the other to form a layered assembly, with one of the warp fibers or the weft fibers of the UHMWPE fabric oriented in a direction of rotation of the cylinder and the other of the warp fibers or the weft fibers of the UHMWPE fabric oriented parallel to an axis of the cylinder. The step can then be taken of clamping the layered assembly to the cylinder. This enables one of the warp fibers or the weft fibers of the UHMWPE fabric to be mechanically constrained by clamping, and the other of the warp fibers or the weft fibers to be constrained by frictional forces induced from the layered assembly being wrapped around the cylinder.

Where such a layered assembly is used, it is preferred that the layered assembly include a separator film that inhibits one wrap of the layered assembly from adhering to subsequent wraps of the layered assembly. The separator film, when used, is thrown away after use, but ensures that portions of the layered assembly do not adhere to other portions.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A composite UHMWPE material 20 and a method of manufacturing the same will now be described with reference to FIG. 1 through FIG. 6.

Figure 1:
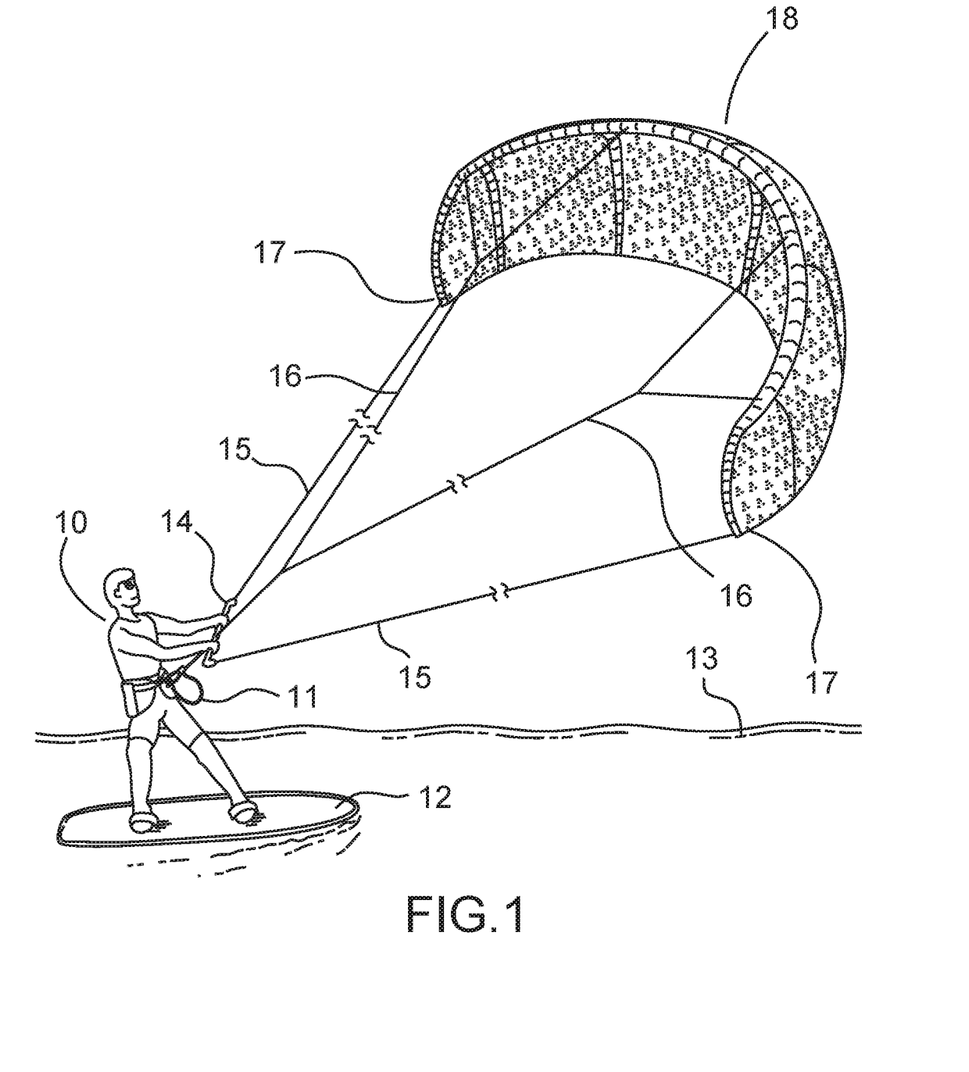
FIG. 1 is a perspective view of a kite used in the sport of kiteboarding.

To show the application for which the composite UHMWPE material was developed, FIG. 1 has been provided. FIG. 1 illustrates a kiter 10 engaged in the sport of kite boarding or kite surfing. The kiter stands on a kite board 12 on the water surface 13 holding a control bar 14. Outside (steering) lines 15 are connected near the wingtips 17, and inside lines 16 are also attached to the kite 18 at the distil end. Outside lines 15 are connected to control bar 14 to provide for steering the kite. Inside lines 16 are connected at the proximal end to a hook mechanism on the kiter's harness. A safety leash line 11 connects the kiter to one or two of the inside lines to remain tethered to the kite in the event the kiter lets of the control bar and also detaches from the hook connecting the inside lines. The kite 18 is not attached to the board 12. The kiter 19 manoeuvres kite 18 so as to pull the kiter and the board 12 across the surface of the water 13.

Figure 2:
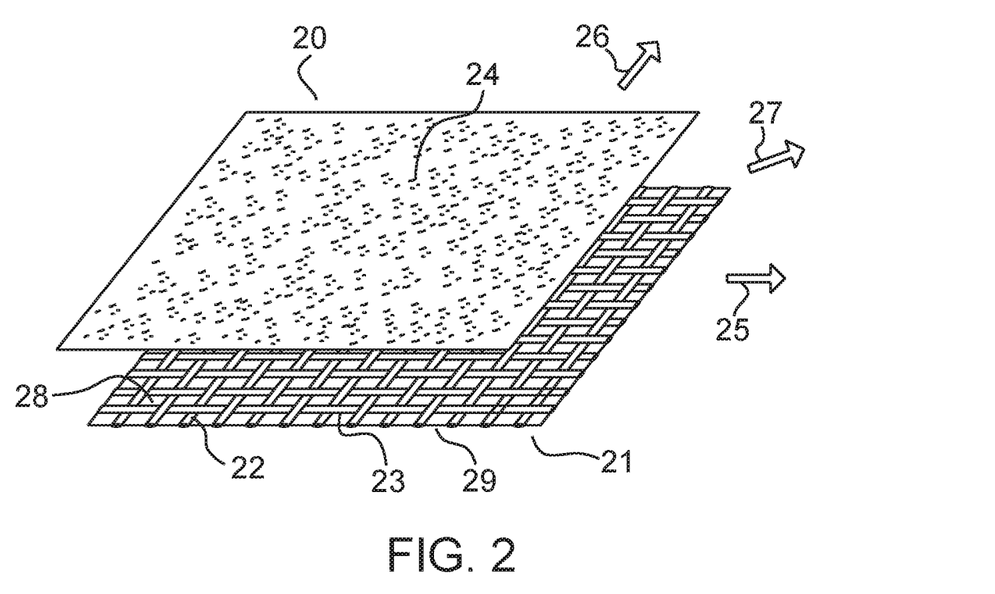
FIG. 2 is an exploded perspective view of material layers.

Referring to FIG. 2, the composite UHMWPE material 20 includes a single ply of high tenacity plain woven UHMWPE fabric 21 having warp fibers 23 oriented in a first direction indicated by arrow 25 and weft fibers 22 oriented in a second direction indicated by arrow 26 and orthogonal to first direction 25. A bias direction is also indicated as identified by reference numeral 27. UHMWPE fabric 21 has a first face 28 and a second face 29. A stretch resisting fusion layer 24 is fused to at least one of first face 28 or second face 29 of the UHMWPE fabric, which fusion layer 24 is preferably an biaxially oriented polymer film with an axis aligned parallel with at least one of first direction 25 or second direction 26, such that stretch resisting fusion layer 24 inhibits bias stretch of UHMWPE fabric 21. The tensile strength of the warp fibers 23 and weft fibers 22 are within 50%, preferably 25%, preferably the same. Other types of fabric weave patterns, for example, twill weave, can also be used.

For a kite leading edge cover, an UHMWPE fabric weight of about 60 gsm would provide a significant weight reduction compared to the prior art 160 gsm Dacron now used. To achieve such weight reduction, it is possible to weave a pattern having a yarn count of about 200 D (Denier) for each of the warp and weft directions, with a density of about 33 yarns per inch for each of the warp and weft directions. Such a plain woven pattern was measured to give a tensile strength in each of the warp and weft direction of about 300 lb/inch (2,700 N/5 cm), which tensile strength is almost 3 times the strength of the prior art Dacron material. Based on tensile strength, an UHMWPE fabric weight of 25-100 gsm is acceptable, although a weight range of 45-85 gsm is preferred, where such weight includes the weight of the fusion layer component of the UHMWPE fabric composite.

One advantage of high tensile strength fabric is that it allows a kite leading edge cover to be inflated to much higher pressures than possible with prior art Dacron, resulting in a more rigid kite structure, which rigidity can be advantageous for some kiters. As the single ply UHMWPE fabric 21 is not air or water permeable, and has high bias stretch, the stretch resisting fusion layer 24 is preferably fused to the UHMWPE fabric layer 21. Such stretch resisting fusion layer is preferably comprised of a polyolefin-based material such as, for example LDPE (low density polyethylene) film, HDPE (high density polyethylene) film, a polyethylene film made from a dispersion, a UHMWPE film, or a polyimide film, a non-woven polyethylene fabric, or a biaxially oriented polymer film, such as, for example, biaxially oriented polyethylene terephthalate or biaxially oriented polypropylene.

Figure 3:
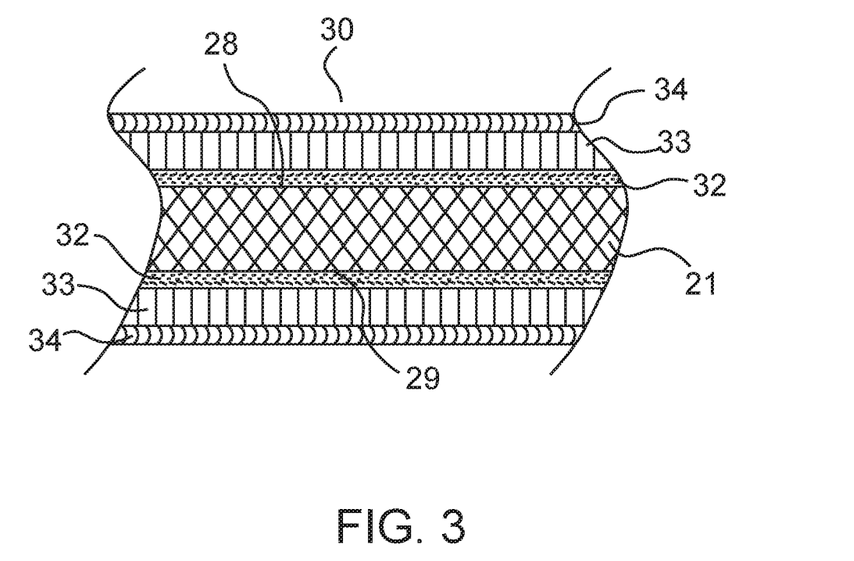
FIG. 3 is an enlarged section view of a layered assembly of material.

Many fabrics, including UHMWPE fabrics, are affected by UV, and as such, some level of UV protection is preferred, as the material tensile strength can be reduced by about 50% or more after about 500-1,000 hours exposure in direct sunlight. Those skilled in the art will understand that there are various additives and methods used in the prior art to provide for UV protection. Referring to FIG. 3, a stretch resisting fusion layer composite 30 is illustrated which has been modified to allow for UV protection, and also to provide for additional bias strength. Stretch resisting fusion layer composite 30 consists of a bi-axially oriented polymer layer 33 having a polyolefin coating 32, preferably polyethylene, on at least one side. It is the side having polyolefin coating 32 which is bonded to UHMWPE fabric 21. Preferably, the biaxial oriented polymer layer 33 is comprised of biaxial oriented polyethylene terephthalate film. A UV resistant coating 34 can be added to polyethylene terephthalate layer 33. Additionally, a hydrolysis resistant coating can be added onto the UV resistant coating. Such UV protective layer can also be a chemical additive within the polyethylene terephthalate polymer matrix. The advantage of using a biaxial oriented polymer, such as polyethylene terephthalate, is that such a polymer has high tensile strength, and when bonded as part of a laminate to UHMWPE fabric, reduces the bias stretch of the UHMWPE fabric, and also provides increased tensile strength to the warp and weft fibers. The addition of the stretch resisting fusion layer does add weight. Experiments indicate that, for example, a 9 micron thick polyethylene terephthalate film, having a polyolefin fusion layer, and a UV protective layer, would add about 15-25 gsm of weight to the LE composite fabric.

Referring to FIG. 3, UHMWPE fabric 21 can be bonded between two bias stretch resistant fusion layers 30 for reduced bias stretch.

For the kite canopy, a similar construct can be used. However, in this case, a UHMWPE fabric having a weight of 10-15 gsm is preferred, where such material would have a reduced yarn count and density, as the required warp and weft tensile strength would be in the range of about 45-70 lb/in (260-355 N/5 cm). By fusing a UHMWPE woven fabric with a fusion layer film as described for the LE above, a total canopy weight of about 25-45 gsm can be achieved, which weight compares to 50 gsm for a prior art Dacron canopy, and a tensile strength of 30-50 lb/inch (270-440 N/5 cm).

It will be appreciated that the kite's leading edge fabric can also have a hybrid weight distribution of UHMWPE fabric having different weights, for example, with the stmt fabric being lighter, and the ends of the leading edge fabric being lighter, than the main portion of the kite's leading edge. The use of lighter fabric, with a lower tensile strength, is possible in these areas, as the tensile force exerted on the fabric in these areas is lower than the tensile force exerted on the fabric in the central portion of the kite's leading edge, which portion has a larger diameter.

Figure 4:
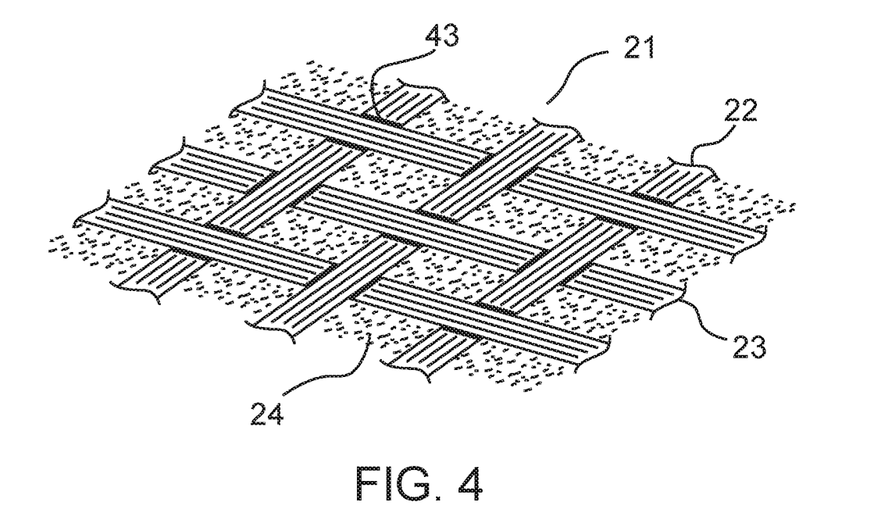
FIG. 4 is an enlarged top plan view of material layers.

Referring to FIG. 4, there is shown an enlarged view of composite UHMWPE material 20 after co-melting of stretch resisting fusion layer 24 with the amorphous (non-crystalline) polyethylene component of UHMWPE fabric 21. Part of the co-melted polyethylene is shown as 43, which acts to fuse warp fibers 23 to weft fibers 22 at their overlap regions. Critically, the crystalline portion of warp fibers 23 and weft fibers 22 do not melt at the process temperature of 152° C., as the warp fibers 23 and weft fibers 22 are constrained, which constraining action prevents significant shrinkage, and raises the crystalline component of the fibers' melting temperature to about 160-161° C. Preferably, the constrained warp fibers 23 and weft fibers 22 do not shrink appreciably during heating at 152° C., preferably less than 15%, preferably less than 10%, preferably less than 5%. Interestingly, unconstrained warp fibers 23 and weft fibers 22 would shrink about 60% at about 145° C., and melt at about 148-150° C.

Preferably, the inventive process construct is heated at 150-156° C., preferably at 150-153° C., preferably at 151° C., in a high accuracy, high precision oven, for 10 minutes-2 hours, preferably for about 20-40 minutes, which process melts the stretch resisting fusion layer 24, and fuses warp fibers 23 and weft fibers 22 at their contact areas. Such fusion of warp fibers 23 and weft fibers 22 acts to increase the bias strength which reduces the tendency of the kite's inflated leading edge to twist during powering the kite through the horizon. By replacing the stretch resisting fusion layer shown as 24 in FIG. 2 with stretch resisting fusion layer composite 30 shown in FIG. 3, the overall bias strength of the inventive construct is improved, as is the UV protection. During the co-melting of the stretch resisting fusion layer 24, as shown in FIG. 4, the stretch resisting fusion layer 24 also acts to seal the open spaces between the plain weave warp fibers 23 and weft fibers 22 of UHMWPE fabric 21 (see FIG. 2). This sealing layer 24 (see FIG. 4) creates an airtight and watertight covering fused to UHMWPE fabric 21. Such fusing of warp fibers 23 and weft fibers 22, and the creation of sealing layer provided by stretch resisting lawyer 24, is applicable for both the inventive LE kite material and also for the canopy kite material.

Method of Manufacture

Figure 5:
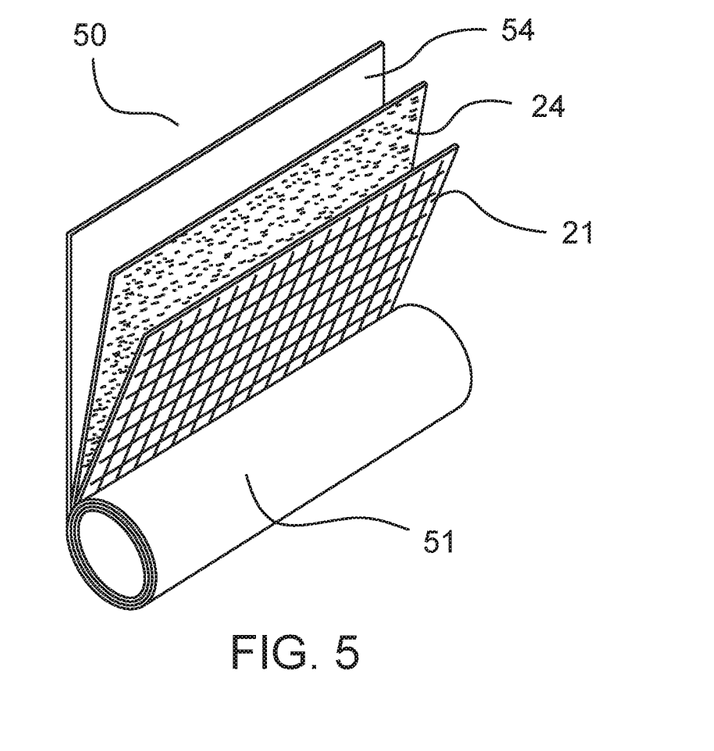
FIG. 5 is a perspective view of material layers wound on a cylinder.

As will hereinafter be further described, early attempts at fusing stretch resisting fusion layer 24 to UHMWPE fabric 21 encountered difficulties due to shrinkage of the UHMWPE fabric. A method was, therefore, developed to constrain the warp fibers 23 and weft fibers 22 of UHMWPE fabric 21 during fusing, by wrapping the layers around a support body. Referring to FIG. 5, a support body, in the form of a cylinder 51, is illustrated partially wrapped with layers of UHMWPE fabric 21 and stretch resisting fusion layer 24. As wraps 50 are made around cylinder 51, a separator film 54 can be used to separate wraps 50. Separator film 54 is not intended to be fused. Separator film 54 is there to separate the wraps and prevent the wraps from becoming fused to each other. When fusing is completed separator film 54 can be thrown away. UHMWPE fabric 21, fusion layer 24 and separator film 54 are wrapped around cylinder 51 without being in tension or compression.

The UHMWPE fabric has two components. One component is what is termed "amorphous", as the polymer chains are not oriented. The second component is what is termed "crystalline", where the polymer chains are oriented. The crystalline phase of the fibers have a higher melting temperature than the amorphous phase, where the crystalline phase, when heated above a critical temperature, causes the fibers to shrink. Thus, the two components of the UHMWPE fabric allows for the selective heating and melting of only the amorphous phase with little or no melting of the crystalline phase, which process is further aided by constraining the warp and weft UHMWPE fibers.

Critically, during heating past about 140° C., the crystalline component of the UHMWPE fabric starts to shrink, thereby providing a highly beneficial compressive force, in the radial direction, on wrapped composite 50, thereby helping to fuse the amorphous component of the UHMWPE warp 23 and weft 22 strands to each other and to stretch resisting fusion layer 24.

Cylinder 51 diameter and length can be chosen for production convenience. Cylinder 51 can be a tube, or solid. It is noted that cylinder 51 has a circular cross-section. It will be understood that the support body around which UHMWPE fabric 21, fusion layer 24 and separator film 54 are wrapped could have a cross-section other than circular, another shape with a curvature such as oval or a polygon with any number of sides, such as triangular, square, rectangular, pentagonal, hexagonal, or more sides. The width and length of wrapped layers of UHMWPE fabric 21 and fusion layer 24, along with separator film 54 can be chosen to match kite assembly requirements.

Figure 6:
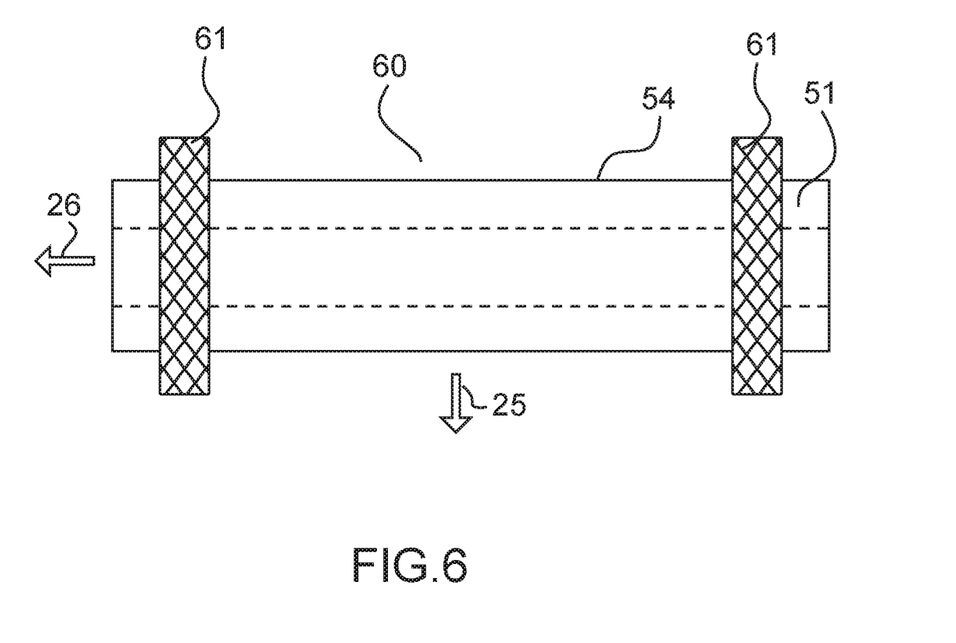
FIG. 6 is a side elevation view of the cylinder illustrated in FIG. 5.

Referring to FIG. 6 shows layered assembly 60. Only an outer layer consisting of separator film 54 is visible in this view. Separator film 54 and underlying layers (UHMWPE fabric 21 and fusion layer 24 as shown in FIG. 5) are held in place on cylinder 51 by mechanical means, such as an adjustable clamp 61 that is tightened or a compression ring. Once the various layers are wrapped onto a cylinder 51, the layered assembly is restricted from shrinking in the weft direction by mechanical means 61. Shrinkage in the warp direction is restricted due to the frictional force resulting from the overlapping layers, where such frictional force is strongly enhanced by the tendency of the warp fibers to begin to shrink at a temperature over about 135-140° C. After heating, the layered assembly may be allowed to air cool or may be quenched by immersion in a water bath at room temperature. The cooling is performed while continuing to constrain the warp fibers and the weft fibers of the UHMWPE fabric to prevent shrinkage.

It will be appreciated that the warp direction and the weft direction could be reversed, with shrinkage in the weft direction being restricted due to frictional force and shrinkage in the warp direction being restricted by mechanical means.

Referring to FIG. 5, the use of separator film 54 serves to prevent overlapped wraps 50 from fusing to each other. Separator film 54 can be comprised of a material that does not adhere to either UHMWPE fabric 21, or stretch resisting fusion layer 24, during heating to about 151° C., such as, for example, aluminum foil.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:
1. A composite UHMWPE material (20), comprising:
a single ply of high tenacity ultra-high molecular weight polyethylene (UHMWPE) woven fabric (21) having warp fibers (23) in a first direction and weft fibers (22)

in a second direction orthogonal to the first direction, the UHMWPE fabric (21) having a first face (28) and a second face (29), and two stretch resisting fusion layers (24) of a biaxially oriented film, with a first of the fusion layers fused to the first face (28) of the UHMWPE fabric (21) and a second of the fusion layers (24) fused to the second face (29) of the UHMWPE fabric (21), the first of the fusion layer (24) being fused to the first face (28) of the UHMWPE fabric (21) with an axis of the first fusion layer (24) aligned parallel with the first direction and the second fusion layer (24) being fused to the second face (29) of the UHMWPE fabric (21) with an axis of the second fusion layer (24) aligned parallel with the second direction; wherein the first fusion layer (24) fused to the first face (28) of the UHMWPE fabric (21) with the axis of the first fusion layer (24) aligned parallel with the first direction inhibits bias stretch of the UHMWPE fabric (21), the second fusion layer (24) fused to the second face (29) of the UHMWPE fabric (21) with the axis of the second fusion layer (24) aligned parallel with the second direction inhibits bias stretch of the UHMWPE fabric (21), and the UHMWPE fabric warp fibers (23) and weft fibers (22) being fused at their overlap regions by the co-melting of the amorphous component of the UHMWPE fabric (21) increases the bias strength of the UHMWPE fabric (21).

2. The composite UHMWPE material (20) of claim 1, wherein the fusion layer (24) is comprised of one or more layers of a polyolefin, or a biaxially oriented polymer or polyimide film.

3. The composite UHMWPE material (20) of claim 2, wherein the polyolefin is LDPE film, HDPE film, a polyethylene film made from a dispersion, a UHMWPE film, or a non-woven polyethylene fabric.

4. The composite UHMWPE material (20) of claim 2, wherein the biaxially oriented fusion layer is polyethylene terephthalate or polypropylene.

5. A kite (18) having at least one of a leading edge cover or a canopy made from the composite UHMWPE material (20) of claim 1.

6. A method of manufacture of a composite UHMWPE material (20), comprising:
providing a single ply of high tenacity ultra-high molecular weight polyethylene (UHMWPE) woven fabric having warp fibers (23) in a first direction and weft fibers (22) in a second direction orthogonal to the first direction, the UHMWPE fabric (21) having a first face and a second face, the UHMWPE fabric (21) having crystalline components and amorphous (non-crystalline) components; and
positioning two stretch resisting fusion layers (24) of a biaxially oriented film, with a first of the fusion layers (24) fused to the first face of the UHMWPE fabric (21) and a second of the fusion layers (24) fused to the second face of the UHMWPE fabric (21), the first fusion layer (24) being fused to the first face of the UHMWPE fabric (21) with an axis of the first fusion layer (24) aligned parallel with the first direction and the second fusion layer (24) being fused to the second face of the UHMWPE fabric (21) with an axis of the second fusion layer (24) aligned parallel with the second direction;
constraining the warp fibers (23) of the UHMWPE fabric (21) from shrinking;
constraining the weft fibers (22) of the UHMWPE fabric (21) from shrinking;
applying heat and fusing the stretch resisting fusion layer (24) onto the UHMWPE fabric (21) while constraining the warp fibers (23) and the weft fibers (22) to inhibit shrinkage of the UHMWPE fabric (21), the heat applied being a temperature where constrained, only the amorphous non-crystalline component of the constrained UHMWPE fabric (21) melts and the crystalline component does not melt;
cooling the heated UHMWPE composite fabric while continuing to constrain the warp fibers (23) and the weft fibers (22) of the UHMWPE fabric (21);
wherein the first fusion layer (24) fused to the first face (28) of the UHMWPE fabric (21) with the axis of the first fusion layer (24) aligned parallel with the first direction without tension inhibits bias stretch of the UHMWPE fabric (21), and the second fusion layer (24) fused to the second face (29) of the UHMWPE fabric (21) with the axis of the second fusion layer (24) aligned parallel with the second direction inhibits bias stretch of the UHMWPE fabric (21), and the UHMWPE fabric warp fibers (23) and weft fibers (22) being fused at their overlap regions by the co-melting of the amorphous component of the UHMWPE fabric (21) increases the bias strength of the UHMWPE fabric (21).

7. The method of claim 6, wherein the biaxially oriented fusion layer (24) is comprised of polyethylene terephthalate or polypropylene.

8. The method of claim 6, wherein the biaxially oriented fusion layer (24) has a polyethylene coating on one side, which coated layer is bonded to the UHMWPE fabric (21), with the other side having at least one of a UV protective coating or a UV protective additive within said biaxially oriented fusion layer.

9. The method of claim 6, wherein steps are taken of:
wrapping the UHMWPE fabric (21) and the fusion layer (24) around a support body one on top of the other to form a layered assembly, with one of the warp fibers (23) or the weft fibers (22) of the UHMWPE fabric (24) oriented in a direction of rotation of the support body and the other of the warp fibers (23) of the weft fibers (22) of the UHMWPE fabric (21) oriented parallel to an axis of the support body; and
clamping the layered assembly to the support body, such that one of the warp fibers (23) or the weft fibers (22) of the UHMWPE fabric (21) are mechanically constrained by clamping and the other of the warp fibers (23) or the weft fibers (22) are constrained by frictional forces induced from the layered assembly being wrapped around the support body.

10. The method of claim 6, wherein the fusion layer (24) is comprised of one or more of a polyolefin or a polyimide film.

11. The method of claim 10, wherein the polyolefin layer is LDPE film, HDPE film, a polyethylene dispersion, a UHMWPE film, or a non-woven polyethylene fabric.

12. A method of claim 9, wherein the layered assembly includes a separator film (54) that inhibits one wrap of the layered assembly from adhering to subsequent wraps of the layered assembly.

13. A method of claim 12, wherein the separator film (54) is an aluminum foil, a fluoropolymer film, an uncoated polyethylene terephthalate film.

* * * * *